Feb. 24, 1959  F. X. LAMB ET AL  2,875,409
ELECTRICAL INSTRUMENT

Filed Jan. 22, 1954  4 Sheets-Sheet 1

INVENTORS
Francis X. Lamb
Paul Huber
Rayden F. Estoppey
William A. Roy
Alexander Dempster
Taylor, Celli & Jurick ATTORNEYS

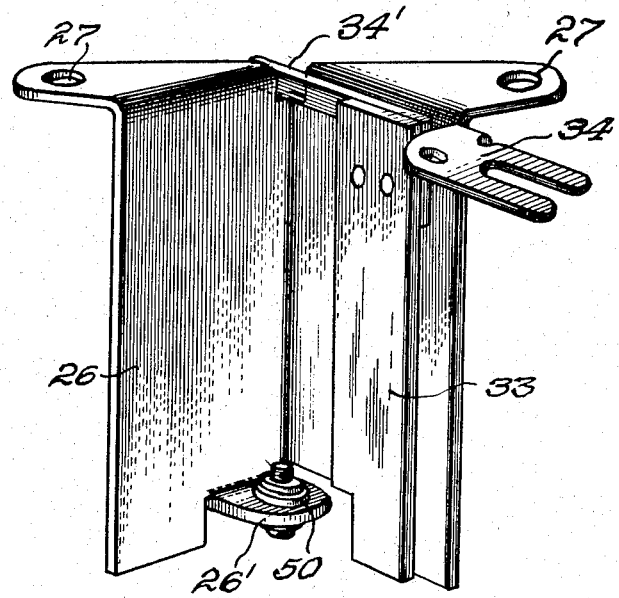
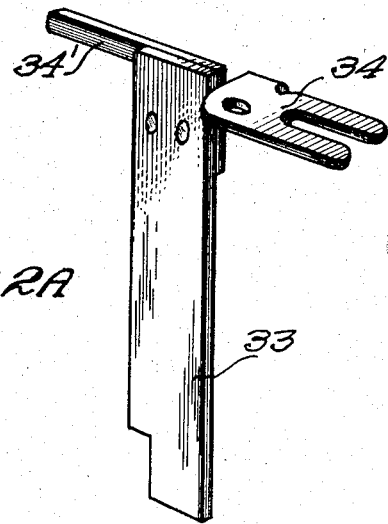

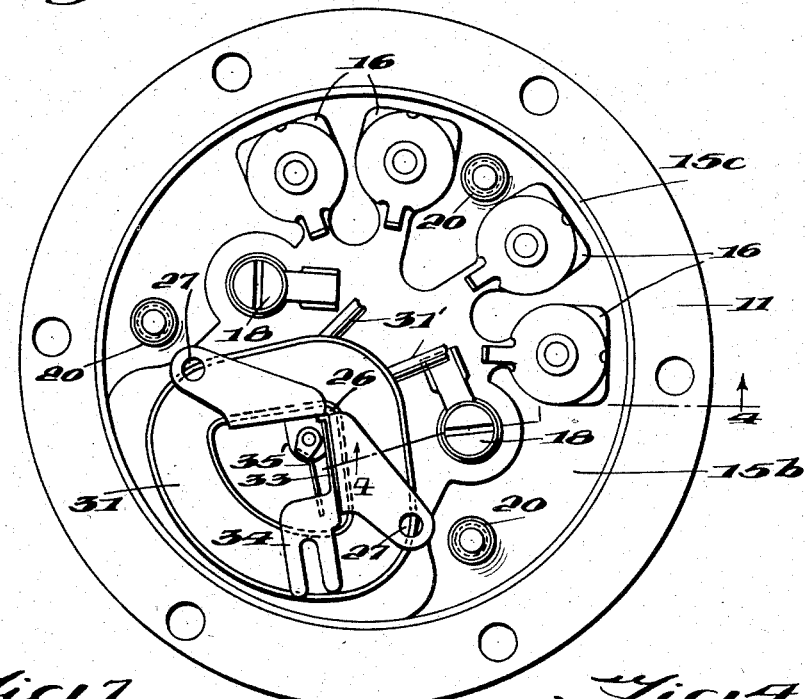
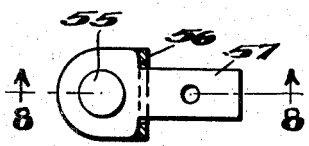
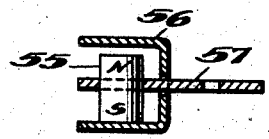
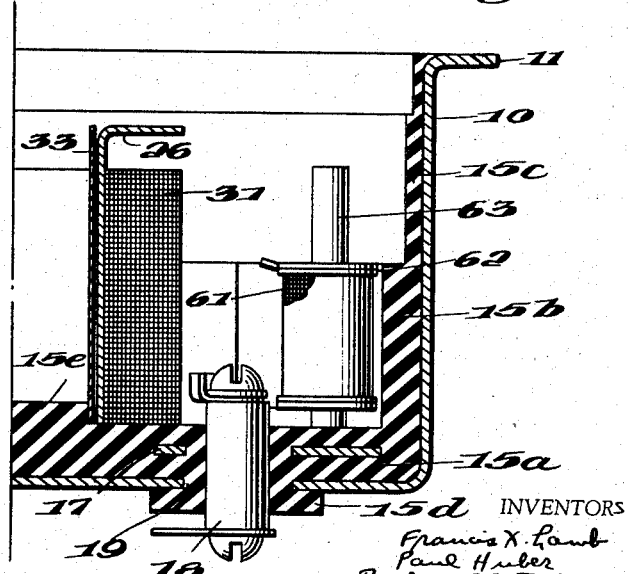
INVENTORS
Francis X. Lamb
Paul Huber
Royden F. Estoppey
William A. Roy
Alexander Dempster
BY
Taylor, Cifelli & Jurick
ATTORNEYS Feb. 24, 1959  F. X. LAMB ET AL  2,875,409
ELECTRICAL INSTRUMENT
Filed Jan. 22, 1954  4 Sheets-Sheet 4
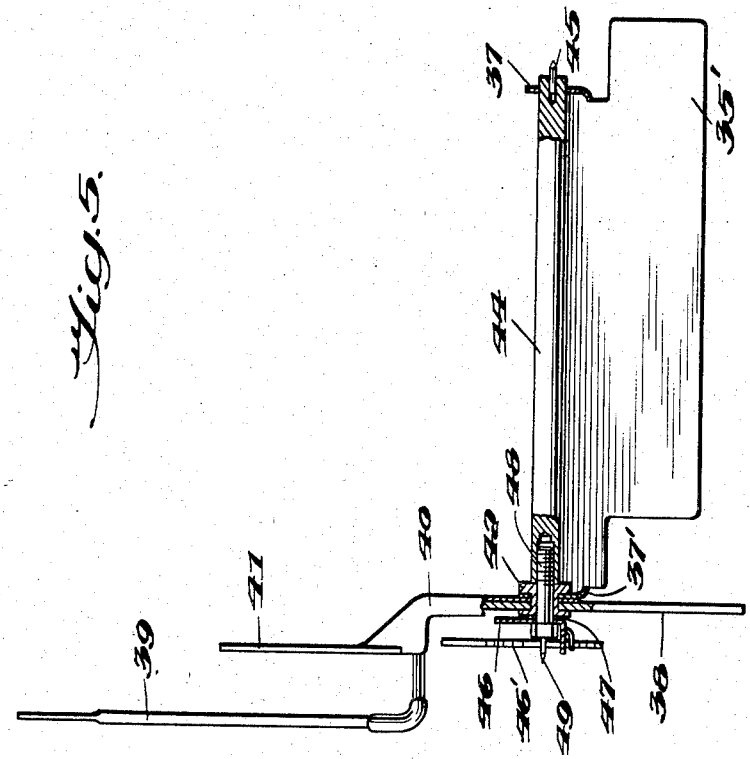
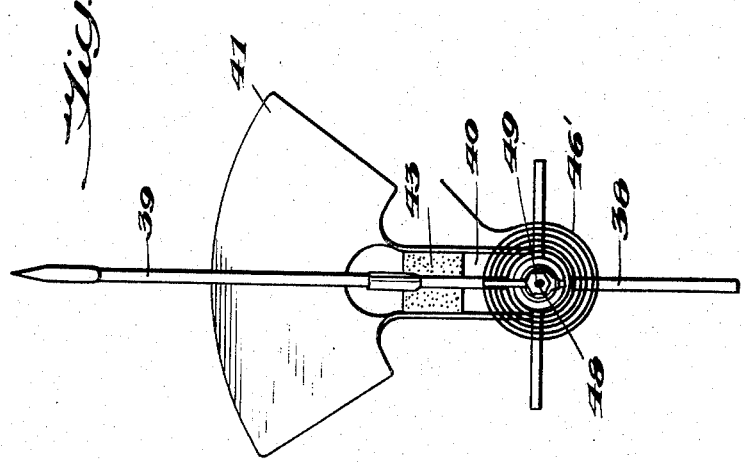
INVENTORS
Francis X. Lamb
Paul Huber
Royden F. Estoppey
William A. Roy
Alexander Dempster
BY
Taylor, Capelli & Jurick
ATTORNEYS

United States Patent Office 2,875,409
Patented Feb. 24, 1959

2,875,409

ELECTRICAL INSTRUMENT

Francis X. Lamb, East Orange, Paul Huber, Hillside, Royden F. Estoppey, Berkeley Heights, William A. Roy, Rahway, and Alexander Dempster, Metuchen, N. J., assignors, by mesne assignments, to Daystrom, Incorporated, Murray Hill, N. J., a corporation of New Jersey Application January 22, 1954, Serial No. 405,612

13 Claims. (Cl. 324—147)

This invention relates to electrical instruments and more particularly to the novel construction of an iron vane type instrument of the ruggedized, sealed class.

Instruments of the class contemplated by this invention generally comprise a case in which the instrument mechanism is mounted, a transparent cover member closing an end of the case and a pointer cooperating with a suitably calibrated scale, the pointer and scale being visible through the cover member. Instruments of this type which are designed to withstand rather severe vibrations and mechanical shocks are known in the art as ruggedized instruments.

While some features of the invention are generally applicable to various types of iron vane instruments, the embodiment herein shown and described is of the ruggedized class in which the instrument mechanism is carried on supporting members which are embedded in a suitable vibration-absorbing material, such as rubber, which covers the base, and extends up along the circumferential wall of the cup-shaped metallic case.

The embodiment of the invention to be described hereinbelow includes numerous novel features all directed toward the provision of a ruggedized, iron vane instrument affording certain construction and assembly advantages. Specifically, the field coil of the instrument is supported in the case between an upper deck and an anchor disc with rubber between each of the supporting members and the ends of the coil. A lateral shifting of the coil is prevented by novel bracket members extending from the supports into the coil. The fixed iron vane is of one piece construction and is adjustable from the front of the instrument when the cover is removed. The positional adjustment of the fixed iron vane affords a full scale adjustment of approximately 15 percent. Further, the movable iron vane includes integral, laterally off-set lugs by which the vane is fastened directly to the balance cross and damping vane. Such construction results in a simple and secure assembly without the need of holes, slots, pins, etc. in the staff as is common in prior constructions. Still further, the instrument includes a top bridge connected directly to a metal, lower jewel bracket, thereby providing a much desired metal connection between the upper and lower jewel bearings for maximum rigidity.

An object of this invention is the provision of an iron vane electrical instrument in which the entire mechanism is supported within a metal case by vibration-absorbing material.

An object of this invention is the provision of an iron vane electrical instrument in which the mechanism is supported between a lower stratum of vibration-absorbing material and an upper deck of rigid insulating material which is spaced from the metal instrument case by vibration-absorbing material.

An object of this invention is the provision of a novel assembly of a movable vane, pointer and damping vane for an iron vane type instrument.

An object of this invention is the provision of a novel mounting arrangement for the fixed iron vane of an electrical instrument and which arrangement permits ready adjustment of the fixed vane relative to the movable vane for purposes of regulating the sensitivity and top scale reading of the instrument.

An object of this invention is the provision of an iron vane electrical instrument including numerous novel constructional features resulting in a ruggedized instrument of pleasing appearance, high dielectric strength and one which can be manufactured, assembled, tested and adjusted with a degree of economy and facility heretofore not possible.

These and other objects and advantages will become apparent from the following detailed description when taken with the accompanying drawings. It will be understood that the drawings are for purposes of illustration and are not to be construed as defining the scope or limits of the invention, reference being had for the latter purpose to the claims appended hereto.

In the drawings wherein like reference characters denote like parts in the several views:

Figure 2A is an isometric view of the fixed iron vane, drawn to an enlarged scale;

Figure 2B is a similar view showing the relative position of the fixed iron vane and the V-shaped positioning plate in the assembled instrument;

Figure 3 is a plan view of the interior of the instrument case as seen with the cover and the outer deck removed, but with the V-plate and relatively-fixed iron vane shown in their relative positions with relation to the field coil of the instrument;

Figure 4 is a fragmentary section on line 4—4 of Figure 3;

Figure 5 is an elevational view, with parts in section, and on an enlarged scale, of the movable system of the instrument;

Figure 6 is a plan view of the same;

Figure 7 is a plan view, on an enlarged scale and with parts broken away, of one of the magnetic damping units; and Figure 8 is a vertical section on line 8—8 of Figure 7.

Figure 1:
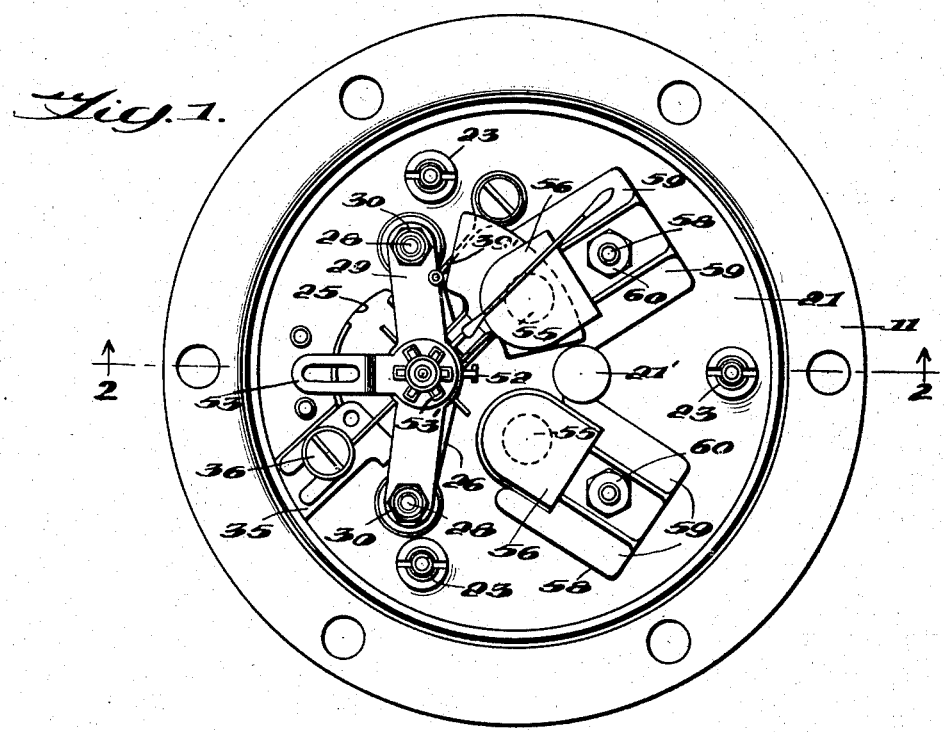
Figure 1 is a plan view of an iron vane instrument embodying the invention, as seen with the cover and the scale plate removed.

In the drawings, the reference numeral 10 identifies a cup-shaped metal instrument case having a radial flange 11 upon which a transparent cover 12 is seated and secured by hollow rivets 13. An ornamental cover ring 14 may be secured over the transparent cover by the bolts 14' which are employed to mount the instrument upon a panel P. A rubber member 15 is molded into the case 10 to provide increased insulation for the instrument parts and a vibration-absorbing mounting for the same. Such rubber member includes a relatively thick base portion 15a covering the bottom of the case 10, an intermediate portion 15b of greater thickness in which a plurality of open-sided recesses 16 are formed, and an outer cylindrical sleeve portion 15c which completes the rubber lining of the inner peripheral wall of the case 10. The transparent cover 12 is preferably domed and includes a depending cylindrical sleeve 12' which telescopes within bears against and may be cemented to the cylindrical rubber sleeve portion 15c. A metal mounting plate 17 is embedded in the base portion 15a of the rubber member and terminal studs 18 which extend through openings 19 in the bottom of case 10 are also embedded in the rubber which extends substantially beyond the outer surface of the case to form bosses 15d which mechanically interlock with the case.

Except for the provision of the recesses 16 in the molded rubber 15, the construction of the instrument housing as so far described may be substantially identical with that described in the co-pending application of Francis X. Lamb, Serial No. 279,129, filed March 28, 1952, and reference is made to that application for a detailed statement of the functions and advantages of the several parts.

In accordance with the invention, a plurality of posts 20 are riveted to the plate 17 and extend outwardly through the rubber member 15 to support a molded plate or deck 21 of rigid insulating material which is secured to the posts by screws 23 threaded into the internally threaded bores at the outer ends of the posts 20. The screws 23 are provided in turn with internally threaded bores at their outer ends and a scale plate 23' is mounted upon them by screws 24.

The deck 21 is provided with a sector shaped opening 25 through which extends a plate 26 of non-magnetic material and of V-shape in transverse section on a plane parallel to the bottom of the case 1. The outer ends of the respective flanges of the plate 26 are bent over and provided with apertures 27, see Figure 3, to fit over threaded posts or studs 28 embedded in the deck 21, and a bridge 29 is also fitted over these studs and clamped upon the plate 26 by nuts 30.

The plate 26 constitutes a positioning guide and lateral support for a field coil 31 of hollow sector shape which is anchored at its outer end by the arcuate flange of a bracket 32 which is secured to the lower face of the deck 21 and at its inner end by a sector-shaped thickened portion 15e of the rubber member 15 which projects outwardly to contact the left flange of the V-shaped plate 26 and enter into the opening of the field coil 31. A rubber gasket 32' is preferably arranged between the outer end of the field coil 31 and both the bracket 32 and the deck 21.

A relatively fixed iron vane 33 extends along the inner surface of the right hand flange of the V-shaped plate 26 and its inner end is resiliently clamped between the plate flange and the adjacent side of the rubber segment 15e. The vane 33 terminates at its outer end in a forked flange 34 which is slidable in a shallow groove 35 formed in the upper surface of the deck 21 and may be clamped in any desired adjusted position therein by a screw 36. This allows for adjusting the position of the fixed iron piece to thereby provide control of the deflection characteristics of the instrument.

A better understanding of the construction of the non-magnetic plate 26 and the fixed iron vane 33, and the relative assembly thereof in the instrument, will be had by reference to Figures 2A and 2B. Figure 2A is an isometric view of the fixed iron vane, drawn to an enlarged scale, and Figure 2B is a similar view showing the fixed iron vane in assembled position relative to the V-shaped plate 26. The forked, flange member 34, preferably made of a non-magnetic material, is spot welded to the fixed iron vane 33 and includes an integral extension 34' of generally rectangular shape in cross section. This extension is adapted to slide within a central notch formed at the upper end of the plate 26. It may here be pointed out that the outer surface of the deck 21 is provided with a channel to accommodate that portion of the extension 34' which extends outwardly of the plate 26. It will be apparent that the fixed iron vane 33 is slidable along the right hand flange of the plate 26 when the fastening screw 36, see Figure 1, is loosened. The upper end of the vane 33 is guided by the extension 34' operating within the notch formed in the V-shaped plate and the forked member 34, operating in the shallow groove 35, see Figure 1, formed in the outer surface of the deck 21. The lower end of the vane is guided by the runway formed between the right hand flange of the plate 26 and the thickened portion 15e of the vibration-absorbing material, see Figure 4. The operating clearances formed with respect to these vane-guiding means are such that the vane is relatively freely movable in a plane parallel to that of the right hand flange of the plate 26 but is restricted against lateral movement relative to such flange. Consequently, when the fixed iron vane 33 is secured in the desired position by the fastening screw 36 the position of the vane will not be varied by mechanical shocks applied to the instrument.

The movable system of the instrument, see Figure 2, comprises the iron vane 35', balance cross 38, pointer 39 and the thin, arcuate damping vane 41 made of aluminum, the latter operating in a permanent magnet flux field as will be described in detail hereinbelow.

Reference is now made to Figures 5 and 6 showing the construction and assembly details of the instrument movable system. The iron vane 35' has integral laterally-bent and apertured ears 37, 37' at its inner and outer ends respectively, and the balance cross 38 of the pointer 39, and the arm 40 of the arcuate damping vane 41 of aluminum are secured to the outer ear 37' by a hollow rivet 42. The damping vane 41 projects symmetrically to the opposite sides of the supporting arm 40 which is preferably of concave cross-section for greater rigidity, and the balance cross 38 is secured to arm 40 by cement 43 with the pointer 39 symmetrically positioned with respect to the damping vane and bent into a plane spaced therefrom to overlie the scale plate 23, see Figure 2. The sub-assembly of balance cross, pointer and damping vane is secured to the iron vane 35' in such position that the pointer 39 is in the plane of, but directed away from, the iron vane 35'.

The movable system staff 44 has a pivot pin 45 secured in and axially of its inner end and an internally threaded bore at its outer end. In assembling the movable system, the inner end of the staff 44 is slipped through the inner apertured ear 37 of the vane 35', the outer end of the staff is alined with the hollow rivet 42, the inner anchor 46 of a spring 46' and a washer 47 are placed over the outer end of the hollow rivet 42, and a screw 48 is then passed through the rivet and threaded into the staff to complete the asembly. The screw 48 has a pivot pin 49 secured in and projecting axially from the head thereof. As shown in Figure 2, the jewel bearings 50, 51 for the respective pivot pins 45 and 49 are respectively mounted on an ear 26', projecting from the V-shaped plate 26 (see also Figure 2B), and on the bridge 29. The outer end of the spring 46' is anchored to a spring abutment 52, see Figure 1, which is resiliently clamped to the bridge 29 by the mounting of the outer jewel 51 and a spring washer 53'. The spring abutment 52 may be provided with the conventional slotted tail 53 for receiving the eccentric pin of a zero adjuster 54. A conventional resilient pointer stop 39' is mounted on the deck 21 to prevent the movable iron vane from contacting, and perhaps sticking to, the fixed iron vane.

The damping vane 41 cuts the magnetic flux generated by a pair of magnetic damping assemblies of the type described and claimed in Patent No. 2,353,618, F. X. Lamb, issued July 11, 1944. As best shown in Figures 7 and 8, each assembly includes a cylindrical permanent magnet 55, a U-shaped shell 56 of soft iron which forms the magnetic circuit, and a brass supporting strip 57 which passes through a slot in the shell 56 and is staked to the magnet 55. The brass strips 57 are apertured to fit over threaded studs 58, see Figure 1, embedded in the deck 21 between parallel bosses 59 thereof which position the respective assemblies in depressions, not shown, in the outer face of the deck 21 and at a proper level. When the securing nuts 60 are turned down on the studs 58, the damping vane 41 is properly positioned to pass between the outer end of the magnets 55 and the adjacent ends of the iron shells 56.

Figure 2:
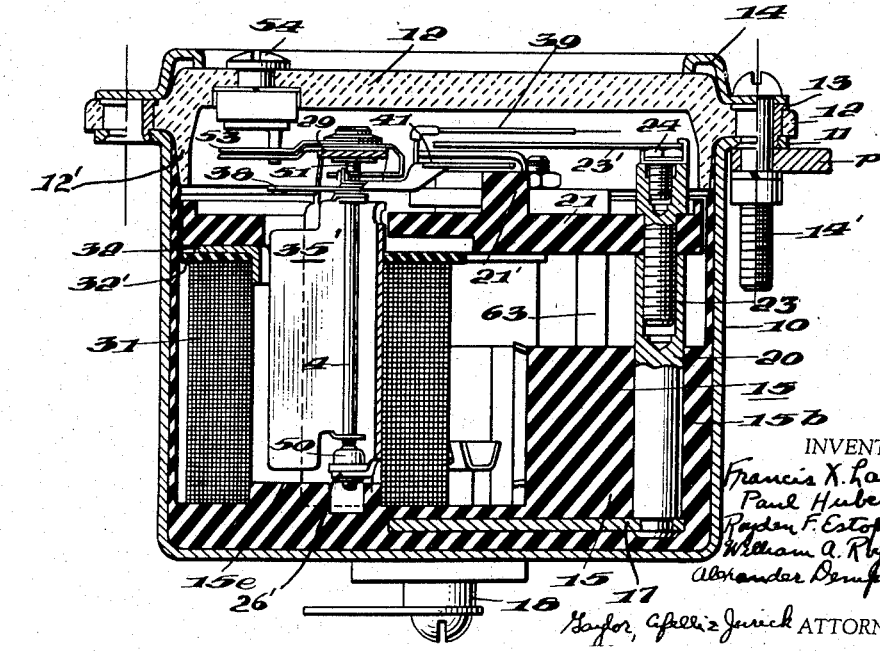
Figure 2 is a central vertical section of the complete instrument as seen on line 2—2 of Figure 1.

As shown in Figures 1 and 2, an integral boss 21' extends upwardly from the upper deck 21. This boss terminates substantially in the plane of the upper ends of the damping magnets 55 and serves as a stop to prevent excessive vertical deflection of the thin damping vane 41 when the instrument pointer lies in the mid-scale position and the instrument is subjected to severe mechanical shock.

The effective measuring range of the instrument is determined by resistance wire windings 61 carried on spools 62 having non-magnetic cores 63 of such length that their outer ends contact the inner face of the deck 21 when the associated spools are seated in the recesses 16 of the rubber member section 15b. The electrical connections of the resistance windings 61 to the terminals 31' of the field coil 31 and the instrument terminal studs 18, to put said windings in circuit therewith, are made in the usual manner but are not shown in Figure 3.

Having now described our invention the novel features and advantages are apparent. By supporting the field coil between the upper deck and the base of the vibration-absorbing member, with properly formed brackets extending into opposed ends of the coil core, there is provided a rigid, well insulated assembly rigidly retaining the coil in its proper, fixed position. The fixed iron vane may be of one piece construction and is adjustable from the front of the instrument when the instrument cover is removed. The vane is held securely at the top end by the grooves formed in the upper deck and a screw, and the lower vane end slides within a close-fitting slot formed in the vibration-absorbing member. Yet, the arrangement is such that the position of the fixed vane may be adjusted by simply loosening the one screw. The assembly of the instrument movable system is simple and straightforward, eliminating the usual holes, pins, etc. in the staff, thereby resulting in a rigid assembly capable of withstanding high mechanical shocks. Further, the instrument jewel bearings are supported in alined, spaced relation by an assembly of metal parts, which assembly is mechanically strong and rigid and of relatively light weight. More importantly, such assembly assures the maintenance of a preset clearance between the instrument pivots and bearings. We are aware of prior instrument constructions wherein the spaced bearings are supported in a single die casting which, however, compared to our assembly, is relatively heavy, of reduced strength and subject to variation in the bearing spacing brought about by aging of the casting and/or the effects of humidity thereon.

While we have illustrated and described a single preferred embodiment of our invention, those skilled in this art will find no difficulty in making changes in the individual parts and/or their relative assembly to meet specific requirements. Such changes and modifications can be made without departing from the scope and spirit of the invention as set forth in the following claims.

We claim:

1. An iron vane electrical instrument of the ruggedized class comprising the combination with a cup-shaped metal case, a unitary rubber member molded within the case and having a relatively thick base portion covering the bottom of the case, a deck of rigid insulating material, and means supporting said deck in spaced and substantially parallel relation to the bottom of the case; of a non-magnetic plate formed as two flanges angularly disposed with respect to each other so as to be of V-shape in transverse section where cut by a plane parallel to the bottom of the case, means securing said V-shaped plate to said deck so that it depends therefrom with its lower edge seated upon said rubber member, a field coil of hollow sector shape in cross-section surrounding said V-shaped plate and seated upon said rubber member, a relatively fixed iron vane supported on said deck and adjustably slidable at its upper end in grooves formed in the upper surface of said deck and extending from top to bottom along the inner surface of one flange of said V-shaped plate, said vane being at its lower end adjustably slidable between the plate and the rubber member, a moving system including an iron vane and attached pointer, and bearing means for said moving system, one of said bearing means being carried by said V-shaped plate.

2. An iron vane electrical instrument as recited in claim 1, wherein said base portion of said rubber member includes a thickened portion of sector shape forming an abutment engaged by a flange of said V-shaped plate.

3. An iron vane electrical instrument as recited in claim 2, wherein said sector shaped portion of said rubber member extends into the central opening of said field coil.

4. An iron vane electrical instrument as recited in claim 1, in combination with means including a gasket of resilient material between said field coil and said deck.

5. An iron vane electrical instrument as recited in claim 1, wherein said instrument moving system includes a segmental damping vane, in combination with means including permanent magnets supported on said deck of rigid insulating material and establishing magnetic flux paths traversed by said damping vane on angular displacement of said moving system, and an upwardly extending boss integral with the deck and terminating substantially in the plane of the upper ends of said magnets as a stop to prevent excessive vertical deflection of said damping vane.

6. An iron vane electrical instrument as recited in claim 1, wherein said means securing said V-shaped plate to said deck comprises posts extending therefrom a metal bridge fitted thereover, nuts clamping said bridge thereto, and the other of said bearing means is mounted on said bridge.

7. An iron vane electrical instrument as recited in claim 6, wherein said deck is provided with a sector-shaped opening therethrough, said V-shaped plate terminates in apertured flanges at its outer end and extends through said deck opening with the apertured flanges fitted over said posts which are anchored in said deck, the ends of said bridge are apertured to receive said studs and superposed upon said flanges, and the nuts are threaded upon said studs to provide said means securing said V-shaped plate to said deck.

8. A moving system for an electrical instrument comprising an iron vane having a pair of apertured ears extending laterally therefrom at its inner and outer ends, a staff having a pivot pin extending axially from its inner end and terminating at its outer end in an internally threaded bore, a pointer including a balance cross, an arcuate damping vane having a supporting arm, a hollow rivet extending through the outer ear of said iron vane and securing thereto both the arm of said damping vane and the balance cross of said pointer, the inner end of said staff extending through and being cemented to the inner ear of said iron vane, and a screw extending through said hollow rivet and threaded into said bore at the outer end of said staff.

9. A moving system as recited in claim 8, in combination with a restoring spring having an inner anchor secured to said staff by said screw.

10. A moving system as recited in claim 8, in combination with a pivot pin mounted in the head of and axially of said screw.

11. An iron vane electrical instrument of the ruggedized class, comprising the combination with a cup-shaped metal case, a unitary rubber member molded within the case and having a relatively thick base portion covering the bottom of the case, a deck of rigid insulating material and means for supporting said deck in spaced and substantially parallel relationship to the bottom of the case; of a non-magnetic plate formed as two flanges angularly disposed with respect to each other so as to be V-shaped in transverse section where cut by a plane parallel to the bottom of the case, means securing said V-shaped plate to said deck so that it depends therefrom with its lower edge seated upon said rubber member, a field coil of hollow sector shape in cross-section surrounding said V-shaped plate and seated upon said rubber member, a moving system including an iron vane and attached pointer, bearing means for said moving system, one of said bearing means being carried by said V-shaped plate, and a relatively fixed iron vane supported upon said deck for adjustment radially of the axis of said bearing means and extending along the inner surface of one flange of said V-shaped plate.

12. An iron vane electrical instrument of the ruggedized class, comprising the combination with a cup-shaped metal case, a unitary rubber member molded within the case and having a relatively thick base portion covering the bottom of the case, a deck of rigid insulating material and means for supporting said deck in spaced and substantially parallel relationship to the bottom of the case; of a non-magnetic plate formed as two flanges angularly disposed with respect to each other so as to be V-shaped in transverse section where cut by a plane parallel to the bottom of the case, means securing said V-shaped plate to said deck so that it depends therefrom with its lower edge seated upon said rubber member, a field coil of hollow sector shape in cross section surrounding said V-shaped plate and seated upon said rubber member, said rubber member extending above said relatively thick base portion to provide a plurality of relatively deep recesses, wire windings in circuit with the field coil and on spools having cores, said spools being seated within said recesses and held to said base portion of said rubber member by the engagement of the outer ends of said cores with the inner face of said deck, a relatively fixed iron vane supported on said deck and extending along the inner surface of one flange of said V-shaped plate, a moving system including an iron vane and attached pointer, and bearing means for said moving system, one of said bearing means being carried by said V-shaped plate.

13. An iron vane electrical instrument of the ruggedized class comprising the combination with a cup-shaped metal case, a unitary rubber member molded within the case and having a relatively thick base portion covering the bottom of the case and extending outwardly from said relatively thick base portion to cover the entire inner surface of said case, a deck of rigid insulating material, and means supporting said deck in spaced and substantially parallel relation to the bottom of the case, including a seating of said deck on said rubber member and said case, in which said supporting means for said deck comprises a metal plate embedded in said base portion of said rubber member, posts secured to said embedded metal plate and extending outwardly therefrom to support said deck, said posts terminating in internally threaded bores and screws passing through said deck and threaded into said bores; of a non-magnetic plate formed as two flanges angularly disposed with respect to each other so as to be of V-shape in transverse section when cut by a plane parallel to the bottom of the case, means securing said V-shaped plate to said deck so that it depends therefrom with its lower edge seated upon said rubber member, a field coil of hollow sector shape in cross-section surrounding said V-shaped plate and seated upon said rubber member, a relatively fixed iron vane supported on said deck and extending from top to bottom along the inner surface of one flange of said V-shaped plate, a moving system including an iron vane and attached pointer, and bearing means for said moving system, one of said bearing means being carried by said V-shaped plate.

References Cited in the file of this patent
UNITED STATES PATENTS

| | | |
|---|---|---|
| 1,719,556 | McCoy | July 2, 1929 |
| 1,835,658 | Mabie | Dec. 8, 1931 |
| 1,861,720 | Romain | June 7, 1932 |
| 2,352,049 | Weaver | June 20, 1944 |
| 2,353,617 | Lamb | July 11, 1944 |
| 2,456,667 | Alter | Dec. 21, 1948 |
| 2,463,844 | Anderson | Mar. 8, 1949 |
| 2,481,276 | Andersson | Sept. 6, 1949 |
| 2,710,377 | Pfeffer | June 7, 1955 |

OTHER REFERENCES

Publication, "Marion Ruggedized Instruments," published by Marion Instrument Co., Manchester, New Hampshire, copyright 1951. (Copy available in Patent Office, Division 69.)